Nov. 10, 1942.   W. GREENWOOD ET AL   2,301,536
THRESHING MACHINE CYLINDER AND CONCAVE
Filed Feb. 9, 1940

Inventors
Wm. Greenwood
and Chas. H. Hill.
By Thorpe & Thorpe
Attorneys

Patented Nov. 10, 1942

2,301,536

UNITED STATES PATENT OFFICE 2,301,536

THRESHING MACHINE CYLINDER AND CONCAVE

William Greenwood, Macksville, and Charles H. Hill, Dodge City, Kans.

Application February 9, 1940, Serial No. 318,130

3 Claims. (Cl. 130—27)

This invention relates to threshing machines (either of the stationary or combine type) and more particularly to threshing cylinders and concaves, the prime object of the invention being to provide a beater or flail type machine, as distinguished from the toothed type of thresher, in which the threshing operation on each bar of the concave is continuous, that is some part of the working edge of each concave bar is always in cooperative relation with some part of a cylinder bar. With all machines of this type with which we are familiar the cooperation between the concave and cylinder bars is step by step or intermittent.

There are a considerable number of advantages which flow from a constant threshing operation, some of them being, a smaller power demand, because the power requirements are substantially uniform or smooth; there is less likelihood that the grain will pile up or "slug" between the bars of the concave and cylinder; there is less likelihood that grain will be carried round and round by the cylinder; and there is a gain in working threshing area between the usual threshing cylinder and concave, and a cylinder and concave of corresponding length and diameter involving the invention.

A further object of the invention is to provide a cylinder in which all of the beater or cylinder bars may be, and preferably are, of uniform construction, rather than requiring alternate right and left-hand bars to equalize the end thrust on the bearings of the cylinder.

With the general objects named in view and others as will hereinafter appear, the invention consists in certain novel and useful features of construction and combination of parts as hereinafter described and claimed; and in order that it may be fully understood, reference is to be had to the accompanying drawing, in which:

With all beater or flail type machines with which we are familiar, a rotating cylinder is provided from which project a series of radially arranged beater bars parallel to the axis of rotation of the cylinder, said beater bars being rapidly rotated to impart a flail-like or beating action on the grain. In cooperative relation with the cylinder is a curved plate or concave, having an operating surface struck from the center of the axis of the cylinder, and said concave is provided with a series of edges or bars extending parallel to the corresponding bars on the cylinder. The effect of the rapidly rotating cylinder bars over the concave bars is to knock the grain from the heads. With the construction aforesaid, with any cylinder, say a 26" cylinder, it will be apparent that the effective threshing area is determined by the passage of 26" cylinder bars over 26" concave bars, it being understood that the cylinder bars must be spaced apart peripherally of the cylinder a distance bearing an optimum relation to its diameter and speed of rotation, otherwise there will be no flail-like action on the grain; there being only two fundamental methods of threshing grain, the flail-like action of the beater, and the rubbing or frictional effect of a toothed cylinder and toothed concave.

We propose to increase the effective threshing area and to make the operation continuous rather than intermittent, by a modification in the form of the cylinder beating bars, and, also by increasing the effective threshing length of the bars on the concave in one form of construction, or second, increasing the effective length of the bars of the cylinder, this latter method being the preferred construction and the one illustrated herein. It is to be understood, however, that a combination of the two constructions may be used, if desired. In either of these constructions, it is desirable that the same linear spacing shall be preserved between each successive bar in comparison to diameter and speed of rotation of the cylinder, as ascertained to be the optimum when said bars are parallel to the cylinder shaft.

Figure 1:
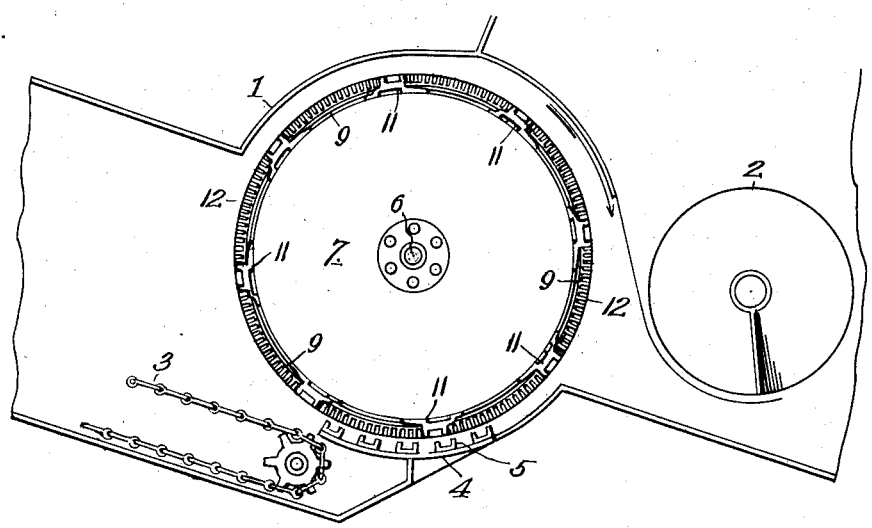
Figure 1 is a fragmentary side elevation of a grain separator with the near side omitted to disclose a cylinder embodying the invention.
Figure 2:
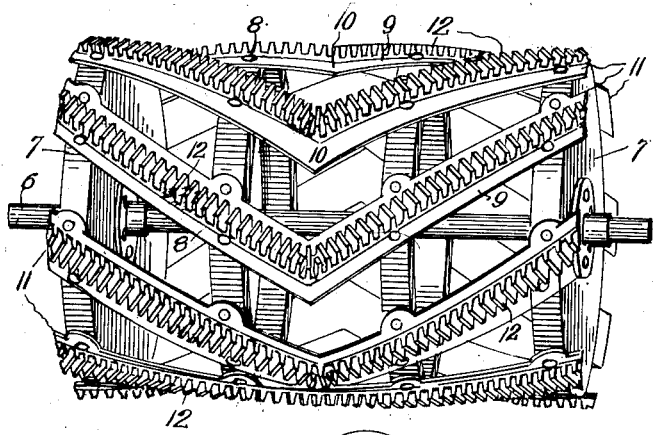
Figure 2 is a perspective view of the cylinder.
Figure 3:
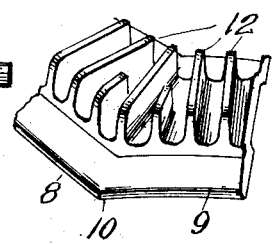
Figure 3 is an enlarged fragmentary view of part of one of the bars of the cylinder.
Figure 4:
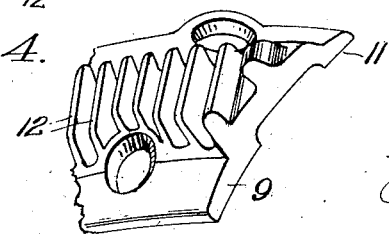
Figure 4 is an enlarged view of the outer end of one of the bars.

In the preferred construction, I represents a cylinder housing, 2 means for feeding grain to the cylinder, and 3 means for removing threshed grain from the cylinder. Of course, the grain could be fed to and removed from the cylinder by hand if thought desirable. The concave of the machine, forming the lower part of the cylinder housing, is shown at 4, and mounted thereon in the construction shown, are a series of straight concave bars 5 of length equal to that of the cylinder hereinafter mentioned. Also mounted in the housing is a cylinder drive shaft 6 and secured on said shaft are a series of spaced equi-diameter disks or rings 7. Bolted or otherwise secured in any suitable manner in spaced relation around the peripheries of the disks 7 are a series of cylinder bars, each of said bars comprising two angularly disposed legs 8 and 9 of equal length in the form shown, so that their overall length exceeds the distance between the outermost disks 7. With the construction shown such an angular bar provides about a 20% greater area than that of a straight bar connecting the endmost drums or disks of an identical cylinder. The bars are all arranged in the same relation to the drums and in the preferred construction the apex 10 of each bar overlaps slightly the trailing edges 11 of the preceding bar. In the preferred embodiment of the invention where the bars are formed in two equal sections or legs, their apexes form the leading edges, the cylinder rotating in the direction of the arrow, Figure 1; and the apexes moreover preferably are positioned in a transverse plane equal distance from the opposite ends of the cylinder, the legs of the bar being at corresponding angles to the direction of cylinder rotation.

From the above description and drawing, it will be evident that if the cylinder bars are smooth or non-corrugated, they will have a sweeping action on the grain, tending to divide the same in the middle and push it toward the opposite ends of the cylinder as the cylinder bars pass over the concave bars. We have, therefore, found it desirable to slot or fin the operating faces of the bars as shown at 12, in which each successive fin lies at an angle to the direction of rotation of the cylinder and the trailing edge of one fin overlaps the leading edge of the successive fin. The grain is caught between the fins and is thus prevented from travelling outwardly toward the ends of the cylinder. If the fins or corrugations 12 on one leg extend in parallel relation to the fins on the other leg, it will be apparent that it will be essential to employ alternate right and left-hand bars around the periphery of the cylinder to equalize the end thrust which would be imposed on the cylinder bearings. However, in the preferred construction, the fins on each leg of the bar are in opposite angular relation to the fins on the other leg of the bar, for example, they may be at right-angles to the longitudinal axis of the legs of the bars, as shown. By this preferred arrangement, each bar is self-equalizing as far as end thrust on the cylinder bearings is concerned; and all of the bars on the cylinder may be exact duplicates.

In order to insure that the working edge of each concave bar is in constant cooperation at one or more points throughout its length with one or more cylinder bars, each successive fin 12 has its leading edge overlapping the trailing edge of the preceding fin, in the direction of rotation of the cylinder. With this arrangement, as all of the fins are of equal length and, on the same leg, are in parallel relation, it will be evident that some working part or threshing edge or fin of a cylinder bar, will always be opposite or in cooperative relation to a concave bar, the resistance or load on the cylinder (assuming even feed) thus being a constant quantity, as distinguished from the intermittent load demands imposed by beaters extending parallel to the axis of the cylinder, cooperating with straight concave bars; and the gain in effective threshing area is proportional to the increase in length of the bars, other things remaining constant.

From the above description it will be apparent that we have produced a construction embodying all of the features of advantage set forth as desirable; and while we have described and illustrated the preferred embodiment, it is to be understood that we reserve the right to all changes within the spirit and scope of the appended claims.

We claim:

1. A cylinder bar for threshers comprising a bar having a pair of legs bearing an angular relation to each other, and fins projecting from one face of said bar, the trailing edge of each fin overlapping the leading edge of the next successive fin, said bars being adapted for attachment to a threshing cylinder so that the longitudinal axes of the fins will be at an angle between parallelism and perpendicularism in relation to the axis of said cylinder.

2. A cylinder bar for threshers comprising a bar having a pair of legs bearing an angular relation to each other, and fins projecting from one face of each of said legs, said fins being arranged at right-angles to the longitudinal axis of their respective leg, said bars being adapted for attachment to a threshing cylinder so that the longitudinal axes of the fins will be at an angle between parallelism and perpendicularism in relation to the axis of said cylinder.

3. A cylinder bar for threshers comprising a bar having a pair of legs bearing an angular relation to each other, and fins projecting from one face of said bar, the trailing edge of each fin overlapping the leading edge of the next successive fin with all of said fins arranged at right-angles to the longitudinal axis of their respective leg, said bars being adapted for attachment to a threshing cylinder so that the longitudinal axes of the fins will be at an angle between parallelism and perpendicularism in relation to the axis of the cylinder.

WILLIAM GREENWOOD.
CHARLES H. HILL.